United States Patent Office 3,275,573
Patented Sept. 27, 1966

3,275,573
POLYMERIC EPOXIDES
Edwin J. Vandenberg, Wilmington, Del., assignor to Hercules Incorporated, a corporation of Delaware
No Drawing. Filed June 30, 1964, Ser. No. 379,390
6 Claims. (Cl. 260—2)

This application is a continuation-in-part of my application U.S. Serial No. 45,530, filed July 27, 1960, (now U.S. 3,158,581), which is in turn a continuation-in-part of my application U.S. Serial No. 812,079, filed May 11, 1959 (now U.S. 3,135,705), which is in turn a continuation-in-part of my application U.S. Serial No. 738,626, filed May 29, 1958, and now abandoned.

This invention relates to new high molecular weight amorphous copolymers of epoxides and, more particularly, to copolymers of a halogen-containing epoxide and at least one other epoxide.

It is well known that halogen-containing epoxides, such as epichlorohydrin, can be polymerized to low molecular weight homopolymers that are useful as plasticizers, etc. Such polymers have, however, been limited in their usefulness. It is also known that epichlorohydrin can be polymerized to high molecular weight crystalline homopolymers.

It has now been discovered that epoxides containing at least one aliphatic halogen group can be copolymerized with at least one cycloalkylene oxide, phenyl alkylene oxide, or phenyl glycidyl ether to produce new and useful high molecular weight amorphous copolymers that, unlike the prior art liquid or crystalline homopolymers, are usually elastomeric and are capable of being vulcanized to products possessing a variety of uses.

Accordingly, the present invention relates to a solid amorphous copolymer of an epoxide containing at least one aliphatic halogen group and at least one other epoxide selected from the group consisting of phenyl alkylene oxides, cyclohexene oxide and phenyl glycidyl ether, said copolymer having a reduced specific viscosity (RSV) of at least about 0.5, and more preferably at least about 1.0, as measured on a 0.1% solution of the copolymer in α-chloronaphthalene at 100° C.

The term "reduced specific viscosity," which is a function of molecular weight, is used herein to designate the $\eta_{sp}/c$ determined on a 0.1% solution of the copolymer in a given diluent and at a given temperature.

The new copolymers of this invention are those produced by the copolymerization of an epoxide containing at least one aliphatic halogen group with at least one cycloalkylene oxide, phenyl alkylene oxide or phenyl glycidyl ether, which copolymers contain from about 1% to about 95%, and preferably from about 5% to about 90%, by weight of said halogen-containing epoxide. The halogen-containing epoxides which can be used in the preparation of these copolymers have the formula

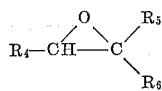

where $R_4$ and $R_5$ are radicals selected from the group consisting of hydrogen, alkyl and haloalkyl radicals, but at least one of said $R_4$ and $R_5$ radicals being hydrogen; $R_6$ is a radical selected from the group consisting of haloalkyl and haloalkoxyalkyl radicals; preferably both $R_4$ and $R_5$ being hydrogen when $R_6$ is haloalkoxyalkyl. Those halogen-containing epoxides having the formula

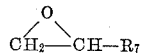

where $R_7$ is either haloalkyl or haloalkoxyalkyl are most preferred. Exemplary of the halogen-containing epoxides are the epihalohydrins, such as epichlorohydrin, epibromohydrin, epifluorohydrin or epiiodohydrin; haloalkyl glycidyl ethers such as 2,2-bis(chloromethyl) ethyl glycidyl ether, 2-chloroethyl glycidyl ether, 2-bromoethyl glycidyl ether, 2-chloro-1-methylethyl glycidyl ether, 2,2,2-tris(chloromethyl) ethyl glycidyl ether, etc.; and haloalkylene oxides such as 1,2-dichloro-3,4-epoxybutane, 1-chloro-3,4-epoxybutane, 1-chloro-4,5-epoxypentane, 1,1-dichloro-2,3-epoxypropane, 1,1,1-trichloro-2,3-epoxypropane, 1,1,1-trichloro-3,4,-epoxybutane, 1,1,1-trifluoro-2,3-epoxypropane, 1,1-bis(chloromethyl) ethylene oxide, 3-chloro-2-methyl-1,2-epoxypropane, cis- and trans-1,4-dichloro-2,3-epoxybutane, etc. Any one of the above-defined halogen-containing epoxides or mixtures thereof can be copolymerized with another epoxide monomer or mixture of monomers selected from the group consisting of cyclohexene oxide, phenyl alkylene oxides such as styrene oxide, etc.; and phenyl glycidyl ether, etc.

The preparation of these new copolymers is readily carried out by contacting a mixture of the monomers with an organoaluminum compound or complex. Any organoaluminum compound reacted with water can be used as the catalyst in the preparation of these copolymers. Exemplary of the organoaluminum compounds that can be used are trialkylaluminum compounds, dialkylaluminum halides, monoalkylaluminum dihalides, dialkylaluminum hydrides, dialkylaluminum monoalkoxides, the corresponding cycloalkyl and aryl compounds and complexes of these compounds. These organoaluminum compounds can be reacted with from about 0.01 to about 1.5 moles of chelating agent per mole of aluminum before being reacted with water, if desired. Exemplary of the chelating agents that can be reacted with a trialkylaluminum or dialkylaluminum hydride and the chelate then reacted with water are diketones, ketoacids, ketoesters, ketoaldehydes, hydroxyaldehydes, dicarboxylic acids and their ester, dialdehydes, ketoximes, dialdehyde monooximes, dioximes, nitro compounds, nitroso compounds, etc. Regardless of the organoaluminum compound that is used, it should be reacted with from about 0.1 to about 1.5 moles of water and preferably from about 0.5 to about 1 mole of water per mole of the organoaluminum compound.

The polymerization reaction is generally carried out in the presence of an inert liquid organic diluent but can be carried out in an essentially bulk polymerization process. Suitable diluents that can be used for the polymerization are the ethers, such as diethyl ether, dipropyl ether, dibutyl ether, etc.; halogenated hydrocarbons such as chlorobenzene, methylene chloride, etc.; a hydrocarbon diluent such as propane, butanes, pentanes, n-heptane, cyclohexene, benzene, toluene, etc.; or a mixture of such diluents. The temperature of the polymerization process can be varied over a wide range, generally from about −80° C. to about 250° C., and preferably from about −30° C. to about 100° C., and while atmospheric or autogenous pressure is usually used, the pressure can be varied from subatmospheric up to several atmospheres, if desired.

The following examples illustrate the preparation of the new copolymers in accordance with this invention. All parts and percentages are by weight unless otherwise indicated.

EXAMPLE 1

To a polymerization vessel with a nitrogen atmosphere was charged 40 parts of toluene, 1.0 part of styrene oxide and 9.0 parts of epichlorohydrin. After equilibrating at 30° C., a 0.5 M catalyst solution consisting of 0.23 part triethylaluminum reacted with 0.5 mole each of acetylacetone and water per mole of aluminum in a 70:30 mixture of n-heptane to diethyl ether was added. After 30 hours at 30° C., the copolymerization was stopped by adding 4 parts of anhydrous ethanol. The copolymer was isolated by precipitating with 1–5 volumes of n-heptane, filtering, washing with n-heptane, washing with a 0.2% solution of 4,4'-thio-bis-(6-tert-butyl-m-cresol) in n-heptane and finally drying for 16 hours at 80° C. under vacuum.

EXAMPLES 2–6

In these examples various epoxides were copolymerized in 80 parts of dry toluene using 20 parts of total monomers at a temperature of 30° C. in Example 2 and 65° C. in Examples 3–6. The diluent and monomers were mixed under nitrogen and after equilibrating at the reaction temperature, 5.8 parts of the catalyst solution were added.

The polymer so isolated in Example 2 amounted to a 7.8% conversion and was a mixture of amorphous and crystalline polymer. This mixture was then agitated at room temperature with 43 parts of toluene per part of polymer for 3 days. The insoluble was centrifuged out and washed with toluene. The toluene supernatents were combined, the toluene evaporated and the residue dried at 80° C. under vacuum. The polymer so isolated amounted to 69% of the total isolated polymer, was amorphous by X-ray analysis, and formed a hard, tough film which adhered very strongly to glass.

In Table I are set forth for Examples 1–6 the monomers copolymerized and the amount of each, the reaction time, the percent conversion to isolated copolymer and the RSV of each copolymer determined on a 0.1% solution in α-chloronaphthalene at 135° C. in Example 1 and 100° C. in Examples 2–6. The monomers copolymerized are indicated by the following abbreviations:

SO = styrene oxide
CO = cyclohexene oxide
PGE = phenyl glycidyl oxide
ECH = epichlorohydrin
CEGE = 2-chloroethyl glycidyl ether The copolymers produced in these examples were largely amorphous, the copolymers of Examples 4 and 6 being completely amorphous as shown by X-ray. The copolymer of Example 1 was insoluble in water and >70% soluble in acetone.

*Table 1*

| Example No. | 1 | | 2 | | 3 | | 4 | | 5 | | 6 | |
|---|---|---|---|---|---|---|---|---|---|---|---|---|
| Polymerization: | | | | | | | | | | | | |
| Monomer | SO | ECH | SO | ECH | CO | ECH | PGE | ECH | PGE | ECH | CO | CEGE |
| Parts of Monomer, Wt. percent | 10 | 90 | 50 | 50 | 80 | 20 | 30 | 70 | 70 | 30 | 20 | 80 |
| Reaction Time, Hrs | 30 | | 46 | | 20 | | 0.5 | | 0.75 | | 20 | |
| Total percent Conversion | | | 17 | | 81 | | | | | | 28 | |
| Isolated Copolymer: | | | | | | | | | | | | |
| Percent Conversion | | | 5.4 | | 62 | | 16.6 | | 15.5 | | 14.4 | |
| RSV | >4 | | 0.5 | | 1.0 | | >5.8 | | >6.4 | | 3.3 | |
| Monomer Composition, Wt. percent | 40 | 60 | 93 | 7 | 85 | 15 | 40 | 60 | 75 | 25 | 6 | 94 |
| Appearance | Somewhat hard tough rubber | | Hard, tough solid | | Hard solid | | Tough snappy rubber | | Very tough rubber | | Snappy tough rubber | |
| X-ray analysis | Largely amorphous | | Wholly amorphous | | Largely amorphous | | Wholly amorphous | | Largely amorphous | | Wholly amorphous | |

In Example 6, a second and equal portion of catalyst was added after 4 hours of polymerization.

The catalyst was prepared by reacting 0.46 part of triethylaluminum in 5.6 parts of a 70:30 mixture of ether and n-heptane with 0.036 part of water (0.5 mole of water per mole of aluminum). The water was added slowly over a period of about 15 minutes, during which time the reaction mixture was maintained at a temperature of about 0° C., and the mixture was then stirred at 0° C. for 1 hour. There was then added 0.20 part of acetylacetone (0.5 mole of acetylacetone per mole of aluminum) during about 10 minutes, with the temperature held at about 0° C., after which the mixture was stirred at 0° C. for 15 minutes and then at room temperature for 20 hours.

After the specified time at the reaction temperature, the polymerization reaction was shortstopped by adding 8 parts of anhydrous ethanol. The total percent conversion was determined, where possible, from a total solids on an aliquot of the reaction mixture. The reaction mixture was then washed twice with 3% aqueous hydrogen chloride, with 1 hour of stirring for each wash, and then was washed neutral with water. The copolymers were precipitated by adding 5 volumes of methanol containing 4,4'-thio-bis-(6-tert-butyl-m-cresol) as stabilizer. The insoluble copolymer was collected, washed twice with the precipitant and then was dried for 16 hours at 80° C. under vacuum.

The copolymer from Example 3 was compression molded at 135° C. for 4 minutes under 1900 p.s.i. pressure. There was obtained a very hard, crystal clear, colorless film.

The copolymer from Example 4 was cross-linked, i.e. vulcanized, by compounding on two-roll mill for 5–7 minutes, 100 parts of the copolymer with the following cross-linking formulation and then was press cured at 155° C. for 45 minutes.

```
                                                       Parts
Fast extruding furnace black _____ 50
Red lead _____ 5
2-mercaptoimidazoline _____ 1.5
```

The physical data on this cross-linked copolymer is given below.

```
Tensile strength, p.s.i. _____ 2325
Modulus, 200%, p.s.i. _____ 1430
Ultimate elongation, percent _____ 375
Break set, percent _____ 10
Shore hardness A₂ _____ 70
```

As stated before, the epoxide copolymers of this invention are solid high molecular weight amorphous polymers usually with elastomeric properties. Where elastomeric properties are observed, it has been found that the copolymers have a reduced specific viscosity of at least about 0.5, and preferably about 1.0 as measured on a 0.1% solution of the copolymer in a α-chloronaphthalene at 100° C. At an RSV substantially below about 0.5, these copolymers lose their elastomeric properties and are incapable of being handled on conventional rubber equipment, and while they can be cross-linked, i.e. vulcanized, the product is either not a useful rubber or not a rubber at all. In the same way, liquid copolymers are not elastomeric and are not amenable to cross-linking, i.e. vulcanization, by conventional rubber technology. Crystalline copolymers are capable of being cross-linked, but the vulcanizates have no elastomeric properties and so are not useful as rubbers. On the other hand, the solid amorphous elastomeric copolymers of this invention having an RSV of at least about 0.5 can be cross-linked to produce useful rubbers. For optimum physical properties, ease of handling on commercial rubber equipment and ease of fabrication, the copolymers of this invention will have an RSV of at least 1.0.

It can be seen from the examples that often a small amount of crystalline copolymer is formed along with amorphus copolymer. Where it is desirable to have solely amorphous copolymer, a separation can be carried out. The various separations that can be employed will be obvious to those skilled in the art. For example, the mixed copolymer can be extracted with an inert solvent, such as acetone, in which the amorphous copolymer is soluble and the crystalline copolymer is insoluble. Another method is to dissolve the mixture in an inert liquid which at elevated temperatures is a solvent for both amorphous and crystalline copolymer and from which the crystalline copolymer will crystallize at low temperatures.

Solid elastomeric copolymers which are essentially wholly amorphous are desirable for use in applications where the best elastomeric properties, i.e., highest elongation with the most rapid recovery, are desired. However, for some applications where less elasticity is desired, an amorphous copolymer can be used in a mixture with a crystalline copolymer. To retain the elastomeric chartertistic, such a mixture should be predominantly amorphous and will contain less than about 30 percent, more preferably less than about 20 percent, of the crystalline copolymer. It should be noted that the amorphous copolymers of this invention are also useful to modify the properties of the crystalline copolymers which are stiff plastics. Thus, mixtures or blends of amorphous and crystalline copolymers, wherein the crystalline copolymer predominates, are more flexible than the crystalline copolymer predominates, are more flexible than the crystalline copolymer and have properties intermediate those of a rubber and those of a plastic.

The amorphous elastomeric copolymers of this invention can be cross-linked to produce new and useful rubbers. Those which are high in the halogen-containing epoxide have excellent swelling resistance to solvents such as the hydrocarbons and chlorinated hydrocarbons. These rubbers usually have excellent building tack and give low heat build-up on flexing. They are outstanding in aging resistance. This includes ordinary outdoor exposure, ozone exposure and heat aging in air up to temperatures of 125° C. Those amorphous copolymers containing a large amount (over about 50%) of a cyclic epoxide monomer, such as styrene oxide or cyclohexene oxide, are not elastomeric, but rather are hard, somewhat rigid compositions, which are advantageous because of their very high molecular weight and thus greatly improved physical properties. They are advantageous over their cyclic epoxide homopolymers since they can be readily cross-linked in the same manner as the elastomers to give harder, more rigid compositions having better high temperature properties and solvent resistance. Such hard, rigid compositions are useful as molded objects, protective coatings, etc. Thus, it can be seen that the amorphous copolymers of this invention are a broad and versatile group of compositions possessing utility in various fields. They can, for example, be used in gaskets, hose, belting, mechanical goods, tires, adhesives, polymeric plasticizers, etc.

Cross-linking can readily be carried out by means of a polyamine. Any amine containing two or more amino groups can be used, as for example, ethylenediamine, tetramethylenediamine, hexamethylenediamine, piperazine, etc. Particularly useful are the salts of these amines such as hexamethylenediamine carbamate. The amine can be simply blended with the copolymer and the mixture then cured at elevated temperature as, for example, at a temperature of from about 120° C. to about 175° C. for about 20 to 40 minutes. Another method of cross-linking these copolymers is to heat a mixture of the copolymer, an amine and a sulfur compound, such as sulfur, a dithiocarbamate, a dialkyl thiuram disulfide, a tetraalkyl thiuram mono- or disulfide or a thiazole. Another method of cross-linking these copolymers is with a mixture of a metal oxide such as red lead and 2-mercaptoimidazoline. Again, the cross-linking agents can be simply blended with the copolymer and the curing effected by heating to a temperature of from about 120° C. to about 175° C. for about 20 to 40 minutes. In addition to the cross-linking agent, other ingredient can be incorporated as, for example, extenders, fillers (carbon black, silica, etc.), pigments, plasticizers and other additives commonly used in rubber vulcanization.

The copolymers of this invention, by virtue of their halogen groups, can be employed in reactions which yield new and useful derived polymers. For example, they can be reacted with a tertiary amine to produce quaternized derivatives that are soluble in water and exhibit cationic properties or they can be reacted with thiourea to give thiouronium salts which can be decomposed to mercaptan derivatives.

What I claim and desire to protect by Letters Patent is:

1. A solid essentially wholly amorphous copolymer of an epoxide containing at least one aliphatic halogen group and at least one other epoxide selected from the group consisting of styrene oxide, cyclohexene oxide and phenyl glycidyl ether, said copolymer having a reduced specific viscosity of at least about 0.5 as measured on a 0.1% solution of the copolymer in α-chloronaphthalene at 100° C, said epoxide containing at least one aliphatic halogen group having the formula

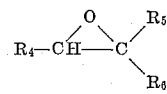

where at least one of $R_4$ and $R_5$ is hydrogen and the other is selected from the group consisting of hydrogen, alkyl and haloalkyl groups, and $R_6$ is selected from the group consisting of haloalkyl and haloalkoxyalkyl groups.

2. The composition of claim 1 wherein the epoxide containing at least one aliphatic halogen group is epichlorohydrin.

3. The composition of claim 1 wherein the epoxide containing at least one aliphatic halogen group is 2-chloroethyl glycidyl ether.

4. A solid essentially wholly amorphous copolymer of epichlorohydrin and styrene oxide, said copolymer having a reduced specific viscosity of at least about 0.5 as measured on a 0.1% solution of the copolymer in α-chloronaphthalene at 100° C.

5. A solid essentially wholly amorphous copolymer of epichlorohydrin and cyclohexene oxide, said copolymer having a reduced specific viscosity of at least about 0.5 as measured on a 0.1% solution of the copolymer in α-chloronaphthalene at 100° C.

6. A solid essentially wholly amorphous copolymer of epichlorohydrin and phenyl glycidyl ether, said copolymer having a reduced specific viscosity of at least about 0.5 as measured on a 0.1% solution of the copolymer in α-chloronaphthalene at 100° C.

References Cited by the Examiner

UNITED STATES PATENTS

| | | | |
|---|---|---|---|
| 2,871,219 | 1/1959 | Baggett et al. | 260—2 |
| 3,127,371 | 3/1964 | Garty et al. | 260—2 |
| 3,186,958 | 6/1965 | Kutner et al. | 260—2 |

OTHER REFERENCES

Ishida: "Chemical Society of Japan Bulletin," vol. 33, pages 731–733, June 1960.

Philips: "Chemical Abstracts," 51, 11397(c), August 1957.

SAMUEL H. BLECH, *Primary Examiner.*

WILLIAM H. SHORT, *Examiner.*

S. N. RICE, *Assistant Examiner.*